Sept. 15, 1970  SEIZHO OHTA  3,528,703

HEADREST FOR VEHICLE SEATS

Filed June 7, 1968   3 Sheets-Sheet 1

INVENTOR.
SEIZHO OHTA
BY Harry G. Shapiro
ATTORNEY

Sept. 15, 1970 SEIZHO OHTA 3,528,703
HEADREST FOR VEHICLE SEATS
Filed June 7, 1968 3 Sheets-Sheet 2

INVENTOR.
SEIZHO OHTA
BY
*Harry G. Shapiro*
ATTORNEY

Sept. 15, 1970   SEIZHO OHTA   3,528,703
HEADREST FOR VEHICLE SEATS

Filed June 7, 1968   3 Sheets-Sheet 3

INVENTOR.
SEIZHO OHTA
BY
*Harry G. Shapiro*
ATTORNEY

United States Patent Office 3,528,703
Patented Sept. 15, 1970

1

3,528,703
HEADREST FOR VEHICLE SEATS
Seizho Ohta, Toyota-shi, Japan, assignor to Toyota Jidosha Kogyo Kabushiki Kaisha, Toyota-shi, Japan, a corporation of Japan
Filed June 7, 1968, Ser. No. 735,430
Claims priority, application Japan, July 11, 1967, 42/44,627
Int. Cl. A47c 7/36, 7/42
U.S. Cl. 297—391                                      10 Claims

ABSTRACT OF THE DISCLOSURE

A head rest for the seat of a vehicle which employs a member contoured and arranged within the headrest to cause the headrest to absorb excessive energy of impact. The member, which is covered by and supports the usual padding, is substantially arch-shaped, and is deformed upon being subjected to an excessive load. The headrest is connected to the vehicle seat by the substantially arch-shaped member, and the connecting means extends into the space or area between the sides of the member.

BACKGROUND OF THE INVENTION

The usual or conventional headrest for a vehicle seat is illustrated in FIGS. 1, 2 and 3. FIG. 1 is a partial view of the backrest of a vehicle seat having a headrest connected thereto. FIG. 2 is a vertical cross section taken approximately in the plane of line 2—2; and FIG. 3 is a partial view of the reinforcing plate and the related connecting means of a conventional headrest. The headrest A is connected by suitable means B to the backrest C of a vehicle seat. One form of conventional connecting means comprises a metal rod bent to U-shape and inverted so that there is a pair of laterally spaced arms 10, 10' with an intermediate horizontally extending portion 12. This latter portion is secured to a rigid reinforcing plate 14, as by welding. The plate 14 having the shape illustrated serves primarily as a support for the padding 16 which is covered by a leather or leather-like material 18. The reinforcing plate 14 is generally made of steel; the plate is not deformable for any useful purpose. In the event of a crash, the passenger's head hits the headrest, and due to the filter material 16, the passenger's head is caused to bounce or rebound from the headrest. At times, the rebound is so great that the head of the passenger may strike the cowling in front of the driver's seat.

SUMMARY OF THE INVENTION

In accordance with the invention, a headrest for a vehicle seat is provided which overcomes the above described inadequacies and disadvantages of known headrests. Although the headrest of the invention includes suitably covered resilient padding, the member which is covered by and supports the padding is made of a selected contour and arranged within the headrest so that excessive energy of impact imparted to the headrest is absorbed instead of causing a passenger's head to rebound and thereby cause injury to the passenger. The member, which also serves to connect the headrest to the seat or the backrest of the seat, is substantially arch-shaped and oriented so that the length of the member extends

2 in the direction of the width of the headrest. Due to the member's contour, the rebound characteristics of the headrest are minimized. Instead, the member is deformed whereby the headrest absorbs impact energy which may be excessive.

The improved headrest of the invention is suitable for use in connection with seats in any of the known or conventional vehicles such as airplanes, automobiles, railway cars, etc.

Thus, a primary object of the invention is to provide a headrest for a vehicle seat which acts to absorb excessive energy of impact to minimize injuries which may result upon impact of the vehicle, or in the event that a vehicle travelling at excessively high speed is suddenly brought to a halt.

Another object of the invention is to provide a headrest which, though it includes conventional resilient padding, affords a headrest construction which uses a reduced amount of such padding, thereby furnishing a saving in material.

Still a further object of the invention is to provide an improved headrest which may utilize conventional means for connecting the headrest to the backrest of a vehicle seat.

These, and other objects and advantages of the invention will be apparent from the following illustration and description of preferred embodiments of the invention.

DESCRIPTION OF THE PREFERRED EMBODIMENTS

Figure 1:
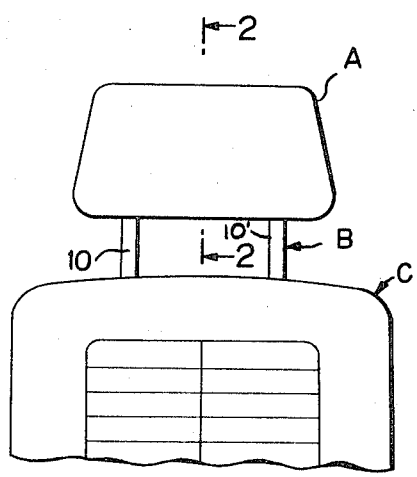
FIG. 1 is a partial view of the backrest of a vehicle seat having a headrest connected thereto.
Figure 2:
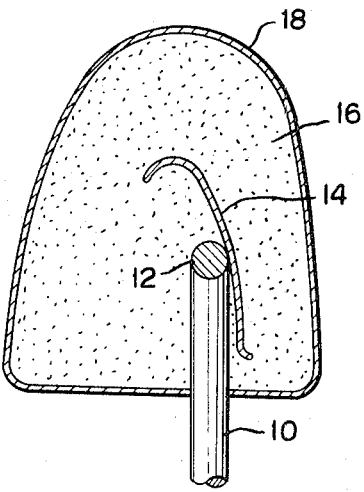
FIG. 2 is a vertical cross section of the headrest.
Figure 3:
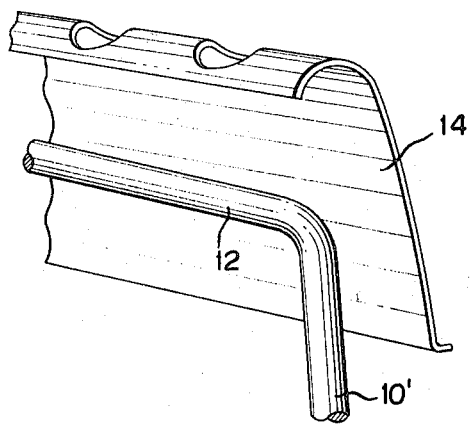
FIG. 3 is a partial view of the reinforcing plate.
Figure 4:
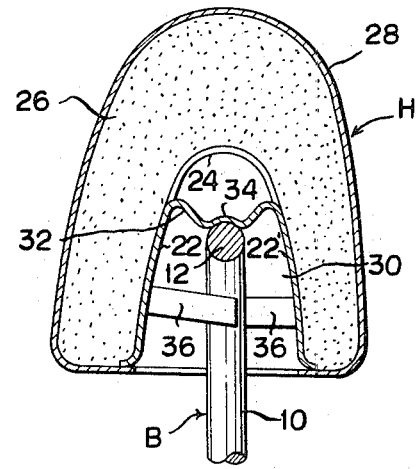
FIG. 4 is a vertical cross section similar to FIG. 2 which shows a headrest structure made in accordance with the invention.
Figure 5:
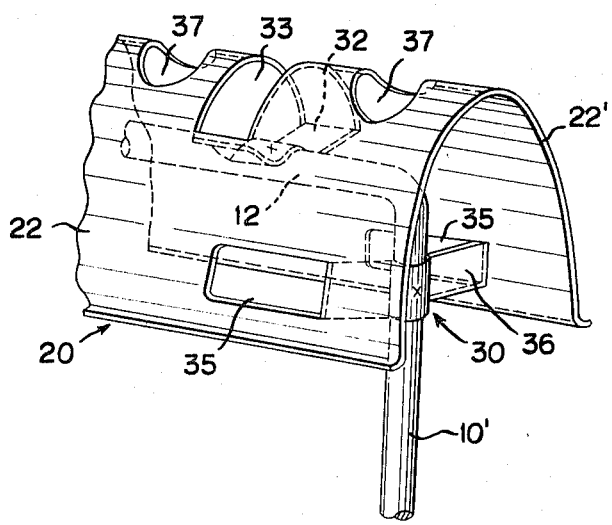
FIG. 5 is a partial, perspective view of the padding supporting member of the invention and its relationship to means for connecting the headrest to a vehicle seat.

Referring to FIGS. 4 and 5, a headrest made in accordance with the invention includes a member 20 having a configuration which, when positioned within the headrest, affords the headrest the ability to absorb an excessive load or excessive energy of impact. The member 20 may be described as substantially arch-shaped; it has spaced sides 22, 22' and a top portion 24 bridging the sides. Alternatively, the member 20 may be described as having an inverted substantially U-shape providing the spaced arm portions 22, 22' and the upper base portion 24 intermediate the arm portions. Preferably, the sides and the bridging top portion of the arch-shaped member are integrally formed to provide a unitary member. The substantially arch-shaped member is oriented so that the length thereof extends in the direction of the width of the headrest, designated H.

The substantially arch-shaped member is shaped from a plate having a selected thickness, and may be made of a suitable aluminum alloy or a ferrous alloy. The material selected for the plate member is a relatively soft metal so that with its described shape it is deformable under an excessive load, in contradistinction to being resilient or substantially nondeformable.

As shown in FIGS. 4 and 5, the substantially arch-shaped member 20 serves as a support for resilient padding 26 which is covered on its exterior by a leather or leather-like material 28. The padding may be of any known or conventional material for this purpose, such as sponge rubber, sponge synthetic rubber, or any other suitable filler material. Polyurethane is a suitable synthetic resilient material. The covering material may be of leather or a leaher-like material of plastic sheeting made, for example, from a vinyl resin. As shown in FIG. 4, the covered resilient padding material has a shape substantially the same as the arch-shaped member 20. The arch-shaped padding covers the substantially arch-shaped member 20. The absence of padding material in the area 30 between the sides 22, 22' of the substantially arch-shaped member results in a savings of padding material.

The member 20 may be connected to the seat by the conventional form of connecting means B as hereinbefore described. As shown in FIGS. 4 and 5, the connecting means B extends into the space or area 30 between the sides of the arch-shaped member. It is preferred to secure the connecting means B to the member 20 in the manner illustrated. A strap or straps 32 are formed in the member at the top thereof. This is accomplished by punching the metal sheet from which the member is made and striking such punched portion out of the plane of the sheet whereby the strap 32 extends substantially horizontally between the sides 22, 22'. Each strap 32 is provided wtih a central bend 34 for mating engagement with the horizontally extending portion 12 of the connecting means B. It is preferred that several longitudinally spaced straps 32 be struck from the bridging portion 24 of the member 20. Such straps are secured to the portion 12, as by welding.

Also, the member may be provided with tabs 36 near each end of the member 20 for connection to the respective vertically extending arms 10 and 10' of the connecting means B. The tabs 36 are formed by punching three sides thereof out of the walls provided by the sides 22, 22' of the arch-shaped member. The fourth side is connected to the side wall of the member, and is struck out from the wall to extend substantially perpendicular from the wall. Each tab 36 is bent to matingly conform with the adjacent side of the vertical portion 10, also 10', of the connecting means B and the parts are secured to one another, as by welding.

The portions of the member 20 which are struck therefrom to provide the straps 32 and the tabs 36 provide openings 33 and 35 in the member. Such openings furnish weakened zones facilitating the desired deformation of the member 20 when subjected to an excessive energy impact load. Additional weakened zones may be provided by punching spaced holes 37 through the bridging portion 24 of the substantially arch-shaped member.

Figure 7:
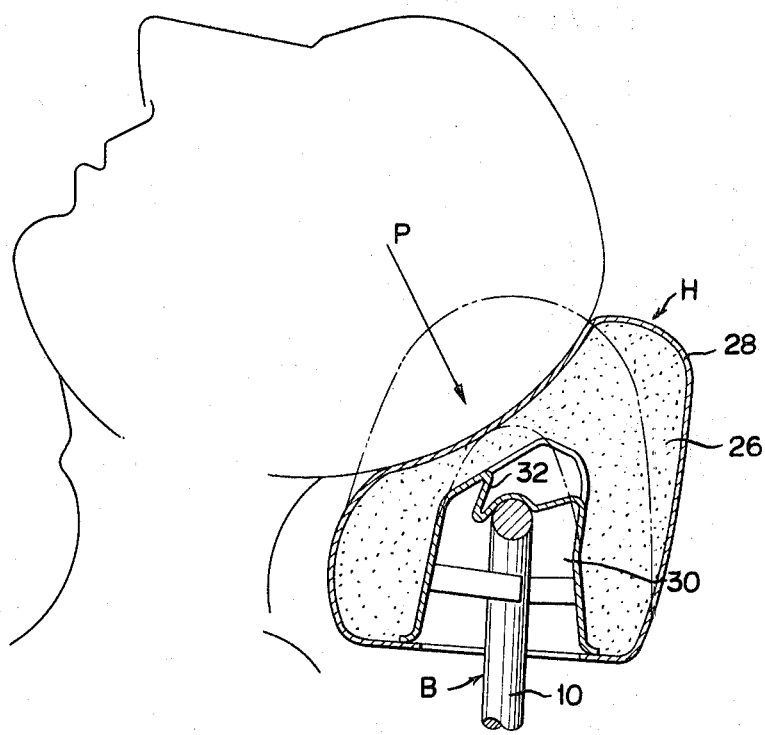
FIG. 7 is a diagrammatic view showing the manner in which the headrest, in the form of the invention shown in FIGS. 4 and 5, reacts to an excessive load imparted thereto by the head of a passenger.

FIG. 7 diagrammatically illustrates the behavior of the described headrest H when an abnormal shock load or an excessively high energy impact load is imparted to the headrest. When the excessive load is applied to the headrest in the direction of the arrow P, the member 20 deforms in substantially the manner illustrated. Although such deformation may require the replacement of the member 20, the head of the passenger is not caused to rebound forward and cause injury to the passenger, as occurs with the conventional headrest.

Figure 6:
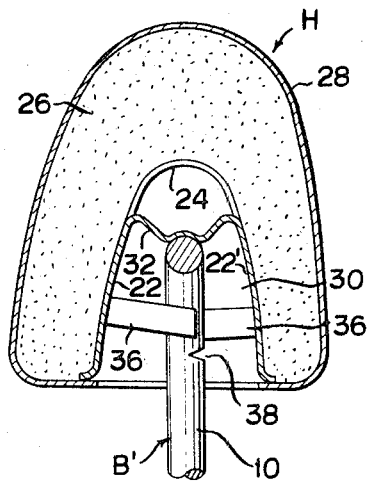
FIG. 6 is a vertical cross-sectional view similar to FIG. 4, this view illustrating another form of the invention.
Figure 8:
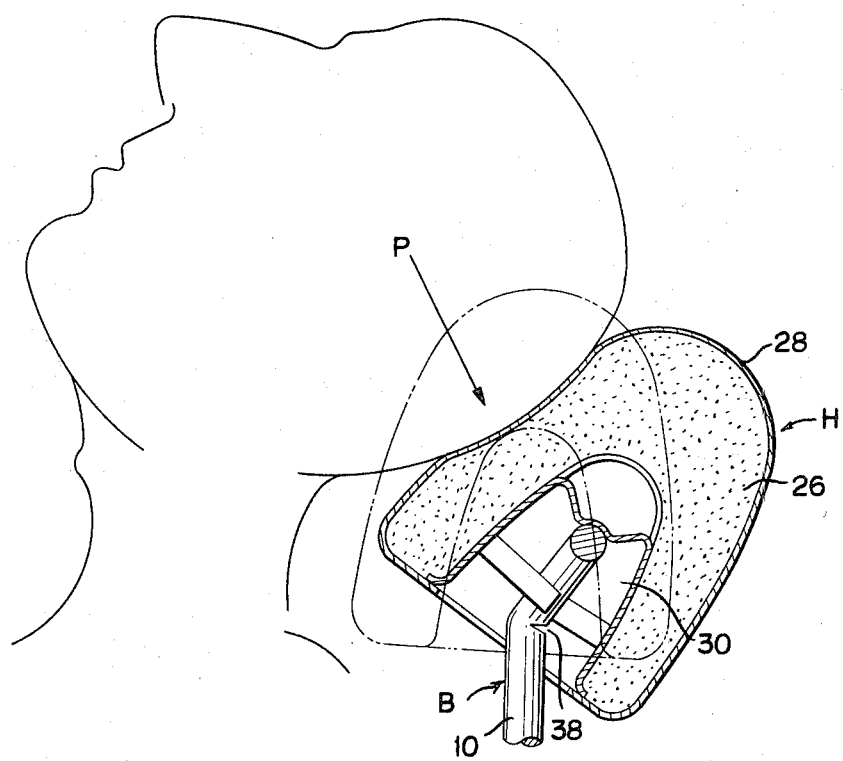
FIG. 8 is a view similar to FIG. 7 except that the headrest connecting means is of the structure shown in FIG. 6.

The headrest H shown in FIG. 6 is the same as hereinbefore described. The connecting means designated B', however, is provided with a zone or zones of weakness. Each vertically extending portion 10 and 10' of the connecting means B' is preferably provided with a V-shaped notch 38. Each notch is located in the space 30 just below the area or areas where the member 20 is secured to the connecting means B'. Also, the notches 38 are located on the rear side of each of the portions 10, 10' of the connecting means B'. The behavior of this construction when an excessive load is applied to the headrest is illustrated in FIG. 8. As shown, the vertically extending portions 10, 10' of the connecting means B' bend at the notches 38 under the excessive load and retard or eliminate the forward bounce of the passenger's head which would otherwise occur. Also, such arrangement lessens the likelihood of deformation of the substantially arch-shaped member 20. In this form of the invention, the weakened zones in the member 20 are not necessary.

Figure 9:
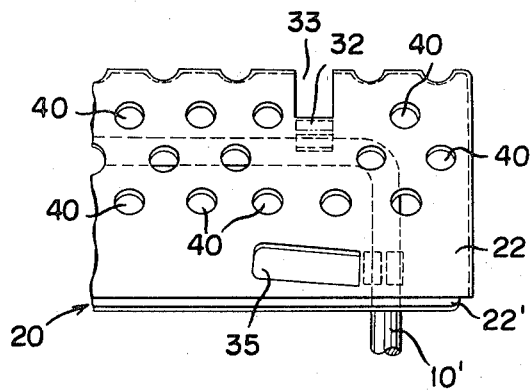
FIG. 9 is a partial front elevational view showing another form of the member made in accordance with the invention.

As shown in FIG. 9, the substantially arch-shaped member 20 may be provided with a series of openings 40 extending through each of the sidewalls 22, 22'. Such openings reduce the strength of the walls or sides 22, 22', thereby assuring more ready deformation of the member 20 when the headrest within which it is disposed is subjected to an excessive load.

While the invention has been described with relation to connecting means which comprises an inverted substantially U-shaped member made of metal rod, the connecting means may have other forms. For example, the connecting means may comprise a T-shaped member made of metal stock having a rectangular cross section. The connection of the single vertical portion of such member to the backrest, which usually is adjustable, will be secure against rotation of the headrest because of the flat area provided by the indicated cross section. The horizontally extending portion at the top of the T-shaped member may be welded to the described member 20 at the bridging portion 24 by the described straps 32, and the tabs 36 may be omitted.

It is believed that the advantages and improved results furnished by the headrest of the invention will be apparent from the foregoing detailed description of the several preferred embodiments thereof.

I claim:

1. A headrest for a vehicle seat comprising a substantially arch-shaped member having a pair of sides and a top bridging portion, the member being oriented so that the length thereof extends in the direction of the width of the headrest, means connecting the member to a seat above the backrest thereof, said connecting means extending into the area between the sides and connected to the top bridging portion of the arch-shaped member, the sides of the arch-shaped member being unsuppported intermediate its ends to allow deformation of the arch-shaped member when an excessive impact force is applied to the headrest, and padding covering and supported by the member.

2. A headrest as set forth in claim 1, wherein the padding is substantially arch-shaped.

3. A headrest as set forth in claim 1, wherein the substantially arch-shaped member is provided with a plurality of openings in the top bridging portion thereof whereby the member is more readily deformable when an excessive impact force is applied to the head rest.

4. A headrest as set forth in claim 1, wherein the sides of the substantially arch-shaped member are provided with a plurality of openings.

5. A headrest as set forth in claim 1, wherein the substantially arch-shaped member is of metal and has spaced portions struck from the sides and the bridging portion for welding to the connecting means; and wherein the connecting means is an inverted substantially U-shaped metal member.

6. A headrest as set forth in claim 5, wherein the sides of the substantially arch-shaped member each have a pair of longitudinally spaced tabs extending therefrom into the space between the sides, said tabs being welded to the arm portions of the inverted substantially U-shaped member.

7. A headrest as set forth in claim 6, wherein the bridging portion of the arch-shaped member has strap portions struck therefrom, and said strap portions are welded to the base portion of the U-shaped member.

8. A headrest as set forth in claim 1, wherein the connecting means comprises an inverted substantially U-shaped member, the arms of said member each being provided with a zone of weakness located in the space between the sides of the substantially arch-shaped member.

9. A headrest as set forth in claim 8, wherein the zone of weakness comprises a substantially V-shaped notch in each arm portion at the rear side thereof.

10. A headrest as set forth in claim 1, wherein the connection of the connecting means to the top bridging portion comprises spaced portions struck from the bridging portion welded to the connecting means.

References Cited
UNITED STATES PATENTS

| | | | |
|---|---|---|---|
| 3,205,005 | 9/1965 | Brown | 297—410 X |
| 3,337,268 | 8/1967 | Belk | 297—397 X |
| 3,437,367 | 4/1969 | Blank | 297—216 X |

CASMIR A. NUNBERG, Primary Examiner

U.S. Cl. X.R.
297—397, 410